Patented June 22, 1937

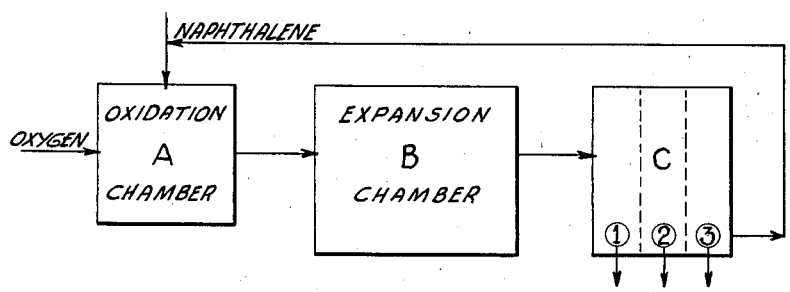
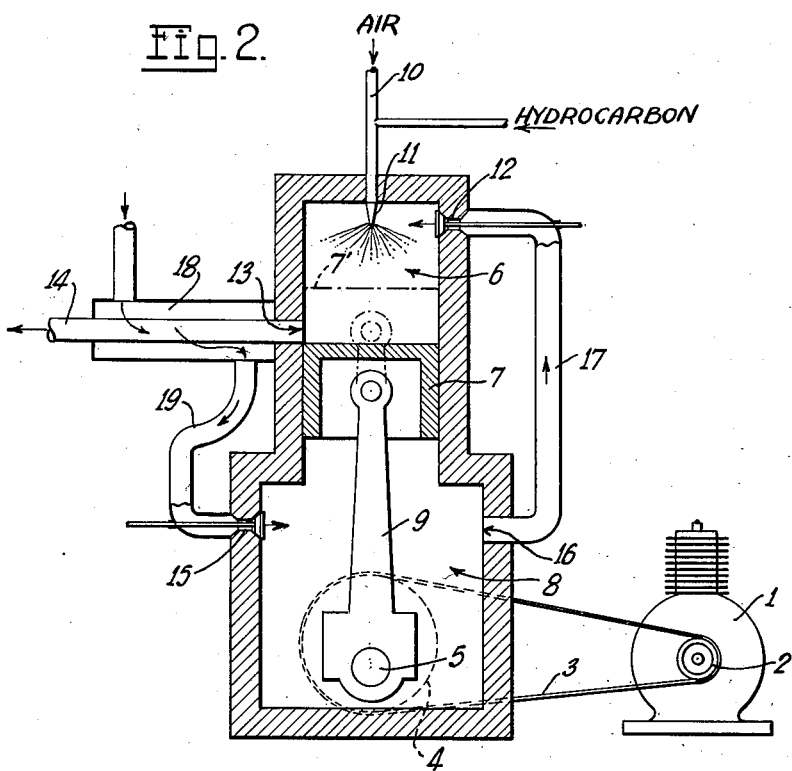

2,084,382

UNITED STATES PATENT OFFICE 2,084,382

PROCESS FOR THE OXIDATION OF POLYNUCLEAR AROMATIC HYDROCARBONS

Leo P. Chebotar, New York, and Roger N. Wallach, Briarcliff Manor, N. Y.; said Wallach assignor of one-sixth to said Chebotar Application April 9, 1935, Serial No. 15,406

7 Claims. (Cl. 260—123)

This invention relates in general to the oxidation of polynuclear aromatic hydrocarbons, and in particular to a process for the oxidation of naphthalene to produce phthalic acid and phthalic anhydride.

It is a general object of the invention to bring about the oxidation of aromatic hydrocarbons in a simple and economical manner without the necessity of designing and building complicated and expensive apparatus for carrying out the reaction.

It is another object of the invention to provide a process for the oxidation of naphthalene at relatively low temperatures whereby there is obtained a maximum yield of phthalic acid and phthalic anhydride and a minimum yield of the higher oxidation products of naphthalene.

Other objects of the invention will in part be obvious and will in part appear hereinafter.

According to the invention, oxidation of aromatic hydrocarbons is accomplished by dispersing the liquid hydrocarbon in an oxygen-containing gas and bringing about the oxidation of the hydrocarbon in the vapor phase at elevated pressure and elevated temperature, thereafter expanding the mixture and separating the products by fractional condensation.

For a more complete understanding of the nature and objects of the invention reference should be had to the following detailed description taken in connection with the accompanying drawing, in which Fig. 1 is a diagram showing the flow of the materials in the process of the invention, and Fig. 2 is a diagrammatical representation of a simple embodiment of a suitable apparatus for carrying out the process.

The process is applicable for treating various polynuclear aromatic hydrocarbons, such, for example, as naphthalene, anthracene, and their derivatives and substitution products as well as members of these classes which are partly oxidized but in which the aromatic ring has not yet been broken.

For bringing about the oxidation there may be employed any suitable oxygen-containing gas, such, for example, as air, ozone, as well as pure oxygen and industrial gases such as water gas.

The oxygen-containing gas may be preheated if desired to a temperature of from 80° to 100° C. It is to be understood that the amount of oxygen employed is at least the amount required, according to the law of chemical equivalency, for the desired oxidation and that, when a gas is used which does not consist of pure oxygen, a quantity of such gas is employed sufficient to provide the required amount of oxygen. Pure oxygen gas is preferred in the process of the invention.

In the preferred embodiment of the invention, the gaseous dispersion of liquid hydrocarbon is oxidized in the presence of a suitable catalyst for the oxidation reaction. For example, for the oxidation of naphthalene there may be employed catalysts consisting of vanadium oxide, tungsten oxide, and mixtures thereof. The catalyst may be comminuted and admixed with the liquid hydrocarbon prior to or during the reaction, or the catalyst may be employed in the form of a solution which is dispersed in the form of a mist and admixed with the mist of hydrocarbon.

The reaction is carried out preferably at an elevated pressure, such, for example, as a pressure of from 10 to 100 atmospheres, and such pressures may be provided by any suitable apparatus. In the preferred embodiment of the invention, the necessary pressures are obtained by carrying out the reaction in the combustion chamber of the Diesel engine type which is forcibly operated by an external prime mover.

The reaction is carried out at an elevated temperature, the temperature required varying, however, both with respect to the pressure employed and with respect to the catalyst. At pressures of from 10 to 100 atmospheres, the oxidation of aromatic hydrocarbons may be effected at temperatures of from 250° to 400° C. It is preferable to carry out the reaction at a given pressure at the lowest possible temperature, whereby there is obtained a maximum yield of the lower oxidation products and a minimum yield of the higher oxidation products. Moreover, under such conditions of low temperature, there is less tendency for the hydrocarbon to carbonize.

There is shown in Fig. 1 of the accompanying drawing a diagram representing the flow of the materials through the process. There is introduced into the chamber A oxygen or oxygen-containing gas and a dispersion of liquid hydrocarbon, for example naphthalene. The oxidation of the naphthalene occurs at an elevated temperature and pressure and the reaction products are then passed into an expansion chamber B where the mixture is expanded and thereby cooled and further oxidation prevented. The expanded gases are then passed into a separation chamber C wherein the several reaction products, such as phthalic acid, phthalic anhydride, and naphthalene, are condensed respectively in sections numbered 1, 2 and 3. The unoxidized naphthalene may be recovered from section 3, reliquefied and returned to the oxidation chamber A as shown in the diagram.

In the now preferred embodiment of the invention, the hydrocarbon is first subjected to a preliminary partial oxidation in a suitable oxidation chamber and the resulting mixture, which contains the products of partial oxidation as well as unoxidized hydrocarbon, is then introduced into chamber A of Fig. 1 and carried through the process illustrated in the flow diagram. This preliminary and partial oxidation step is of advantage in enabling the oxidation of the partially oxidized compounds to be carried out at relatively lower pressures and temperatures than is possible with the use of unoxidized hydrocarbons.

Referring to Fig. 2 of the attached drawing, there is illustrated a simple embodiment of an engine of the Diesel type which may be used for carrying out the oxidation of hydrocarbons in accordance with the process of the invention. The Diesel type engine is driven continuously during the process by a suitable prime mover, such, for example, as a gasoline motor 1, power being transmitted through a drive wheel 2 thereon and a belt 3 to a driven wheel 4 mounted on the crank shaft 5 of the Diesel type engine. The Diesel engine proper comprises a combustion or oxidation cylinder 6, a piston 7, a crank case 8 and a rod 9 connecting the shaft 5 and the piston 7.

The hydrocarbon in a liquid state may be sprayed into the compression cylinder 6 by means of a conduit 10 terminating inside the cylinder with an atomizer 11. Cylinder 6 is provided in its upper part with an inlet port 12 and an outlet port 13 communicating with the exhaust pipe 14. The crank case chamber 8 is provided with an inlet port 15 and an outlet port 16 communicating through the conduit 17 to the inlet port 12 of the chamber 6.

If desired, suitable means may be employed for preheating the oxygen-containing gas to be let in through the port 15 of the crank case 8. Such means may comprise, for example, a cylinder 18 which surrounds the exhaust pipe 14 and through which the oxygen-containing gas may be passed and then led through conduit 19 to the inlet port 15.

The drawing illustrates the position of the piston 7 at the beginning of the compression stroke. During the compression stroke the piston moves upward from the position shown and oxygen-containing gas is drawn into the crank case 8 through the conduit 19 and the inlet port 15. At or just before the end of the compression stroke, the liquid hydrocarbon, such, for example, as naphthalene, is introduced through the conduit 10 and atomizer 11 into the compression chamber 6 in the form of a fine mist. At the end of the compression stroke, the position of the piston 7 is indicated by the broken line 7'. When the piston is in this position the mixture of the naphthalene and oxygen is under a high compression, such, for example, as a pressure of 100 atmospheres, and at a temperature of from 300° to 400° C., whereupon the oxidation of the naphthalene takes place. The expression "pressure" as used herein is intended to designate partial pressure of oxygen alone, therefore, when using air, 50 atmospheres of air correspond to 10 atmospheres of oxygen.

During the expansion stroke the piston 7 moves downward. The increased pressure in the crank case 8 will close the valve of inlet port 15 and open the valve of the inlet port 12, so that part of the oxygen-containing gas in the crank case 8 will be forced through the conduit 17 into the oxidation chamber 6. The oxygen-containing gas introduced into chamber 6 serves the double purpose of sweeping the reaction products out of this chamber through the outlet port 13 and exhaust pipe 14 and simultaneously charging the chamber with a fresh supply of oxygen.

The two-step cycle above described is then repeated continuously during the operation of the engine.

It is to be understood that different modifications and embodiments of the process may be made without transcending the scope of the invention. For example, the process may be carried out in a Diesel type engine or other combustion engine which has four cycles, in which charging occurs in the first step, compression and oxidation in the second step, expansion in the third step and discharging in the fourth step.

Among the novel features of the process herein disclosed is that of employing the hydrocarbon in the form of a mist of finely dispersed liquid drops which enables a larger amount of the hydrocarbon to be injected than when vaporized hydrocarbon is employed. Moreover, in the combustion chamber the liquid evaporates and this action absorbs a considerable quantity of the heat produced by the compression, thus preventing carbonization and undesirable oxidation. Another feature of the process is that reaction is carried out at an elevated pressure. It has been found that reaction starts at a lower temperature when elevated pressures are used, as herein disclosed, and this likewise tends to avoid undesired oxidation and carbonization of the hydrocarbon.

It should be noted that, because of the extremely high pressures employed, the reaction takes place in a very short interval of time. This likewise is of advantage in preventing the formation of the undesirable higher oxidation products and also in preventing cracking of the aromatic ring of the hydrocarbon. If desired, the heat of reaction may be controlled by cooling the oxygen-containing gas just prior to its entry into the combustion chamber. Moreover, the temperature of the combustion chamber may be controlled, as, for example, by employing a chamber having hollow walls through which is passed a cooling medium and/or by employing cooling coils or other means in the interior of the combustion chamber. The dissipation of heat is sudden during the expansion of the reaction mixture and, if desired, the expansion may be step-wise throughout a series of decreased pressures to separate the reaction products one from another. One great advantage of using a Diesel type engine in the process of the invention is the fact that it enables pressures to be created suddenly and for the expansion to take place with great rapidity.

Since certain changes in carrying out the above process may be made without departing from its scope, it is intended that all matter contained in the above description or shown in the accompanying drawing shall be interpreted as illustrative and not in a limiting sense.

We claim:
1. A process for the partial oxidation of polynuclear aromatic hydrocarbons comprising forming a dispersion consisting essentially of a polynuclear aromatic hydrocarbon in the liquid state in an oxygen-containing gas, reacting the mixture in the vapor phase at an elevated pressure of not less than 10 atmospheres and an elevated temperature of not more than 400° C. to form aromatic oxidation products of said hydrocarbon, thereafter expanding the reaction mixture and separating the aromatic oxidation products from said mixture.

2. A process for the partial oxidation of polynuclear aromatic hydrocarbons comprising forming a dispersion consisting essentially of a polynuclear aromatic hydrocarbon in the liquid state in an oxygen-containing gas, reacting the mixture in the vapor phase at a pressure of from 10 to 100 atmospheres and a temperature of from 250° to 400° C. to form aromatic oxidation products of said hydrocarbon, thereafter expanding the reaction mixture and separating the aromatic oxidation products from said mixture.

3. A process for the partial oxidation of polynuclear aromatic hydrocarbons comprising forming a gaseous dispersion consisting essentially of a liquefied polynuclear aromatic hydrocarbon and an oxygen-containing gas, reacting said dispersion in a combustion chamber of the Diesel engine type to form aromatic oxidation products of said hydrocarbon, thereafter expanding the reaction mixture and separating the aromatic oxidation products from said mixture.

4. A process for the partial oxidation of naphthalene comprising forming a dispersion consisting essentially of naphthalene in the liquid state in an oxygen-containing gas, reacting the mixture in a combustion chamber of the Diesel engine type to form phthalic anhydride and phthalic acid, thereafter expanding the reaction mixture and separating the aromatic oxidation products from said mixture.

5. A process for the partial oxidation of naphthalene to phthalic anhydride and phthalic acid, comprising forming a gaseous dispersion of liquefied naphthalene, admixing the dispersed naphthalene with an oxygen-containing gas, reacting the mixture at a pressure of from 10 to 100 atmospheres and a temperature of from 250° to 400° C., thereafter expanding the reaction mixture and separating the products of the reaction.

6. A process for the partial oxidation of polynuclear aromatic hydrocarbons, comprising forming a gaseous dispersion of a liquefied polynuclear aromatic hydrocarbon, passing said dispersion into a combustion chamber of the Diesel engine type, said chamber containing an oxygen-containing gas under pressure, reacting the mixture in said chamber to form aromatic oxidation products of said hydrocarbon, thereafter expanding the reaction mixture and separating the product of the reaction by fractional condensation.

7. A process for the partial oxidation of naphthalene, comprising forming a gaseous dispersion of a liquefied naphthalene, passing said dispersion into a combustion chamber of the Diesel engine type, said chamber containing an oxygen-containing gas under pressure, reacting the mixture in said chamber to form aromatic oxidation products of said hydrocarbon, thereafter expanding the reaction mixture and separating the product of the reaction by fractional condensation.

LEO P. CHEBOTAR.
ROGER N. WALLACH.